US006247095B1

(12) United States Patent
Knudsen

(10) Patent No.: US 6,247,095 B1
(45) Date of Patent: Jun. 12, 2001

(54) DIGITAL REVERBERATION PROCESSOR AND METHOD FOR GENERATING DIGITAL REVERBERATION

(75) Inventor: Carl John Knudsen, Gilbert, AZ (US)

(73) Assignee: Philips Semiconductors, Inc., Tarrytown, NY (US)

( * ) Notice: Subject to any disclaimer, the term of this patent is extended or adjusted under 35 U.S.C. 154(b) by 0 days.

(21) Appl. No.: 09/103,439

(22) Filed: Jun. 24, 1998

(51) Int. Cl.[7] .......... G06F 12/00
(52) U.S. Cl. .......... 711/100; 711/5
(58) Field of Search .......... 345/516, 515; 375/375; 381/63, 61; 84/629; 700/94; 707/205; 711/5, 113, 120, 112, 213, 217, 218, 171, 100; 600/437

(56) References Cited

U.S. PATENT DOCUMENTS 4,499,539 * 2/1985 Vosacek .......... 707/205
5,058,076 * 10/1991 Kuichi .......... 365/230.01
5,140,620 * 8/1992 Woodward .......... 375/375
5,473,348 * 12/1995 Fujimoto .......... 345/518
5,668,338 * 9/1997 Hewett et al. .......... 84/629
5,896,291 * 4/1999 Hewett et al. .......... 700/94
5,918,253 * 6/1999 Kadowaki .......... 711/120
5,924,112 * 7/1999 Barber et al. .......... 711/100
5,971,923 * 10/1999 Finger .......... 600/437

* cited by examiner

*Primary Examiner*—Zarni Maung

(57) ABSTRACT

A reverberation processor and method for generating reverberation in a digital audio processing system. The reverberation processor uses register files programmed with tap page and tap offset addresses to gather the audio data for the reverberation taps. The address of each block transferred is determined by the tap number, which selects an offset register to provide a lower portion of the address, and the page number which selects a page register to provide the upper portion of the address. Control logic provides for enabling of the address and initiation of transfers to and from memory on a bus. Dual port register files are used to receive that data for a digital signal processor (DSP). The DSP computes a reverberation result and fills another dual port register file. The register files signal the control logic to initiate transfers when the input data drops below a threshold or the output data exceeds a threshold. The register files are pre-loaded so that block transfers from each tap are staggered in time and no two transfers occur in any one sample period.

20 Claims, 4 Drawing Sheets

DIGITAL REVERBERATION PROCESSOR AND METHOD FOR GENERATING DIGITAL REVERBERATION

BACKGROUND OF THE INVENTION

1. Field of the Invention

This invention relates generally to digital audio processors and, more specifically, to a PCI bus based digital audio processor containing a reverberation system which does not require auxiliary memory and requires low bus overhead.

2. Description of the Prior Art

Digital reverberation processors are known in the art. An audio signal is created which simulates a signal subject to an acoustic reflection in a natural environment by taking a source signal, delaying it by some time corresponding to the apparent distance the sound travels to the reflecting point and adding a portion of that signal to the original source. This can be performed by writing a digital representation of an audio signal into digital memory on a continuous basis utilizing a circular buffer. The signal data is written sequentially into memory until the end of the buffer is reached. The data is then read at a tap location which is a memory location displaced by some relative offset which corresponds to the reverberation time delay. True natural reflections do not consist of a single reflection, but multiple reflections. In order to simulate this, multiple taps are used where the signal has been delayed by differing times. Portions of the signals at each of these time-delay taps are added to the source signal to achieve a resultant signal which corresponds to the desired source in a reverberative environment. In a digital reverberation processing system, the tapped signals are produced by accessing a memory stored image of the source signal at various points in that image corresponding to different instants in time.

In a typical reverberation system within a sound controller for a personal computer, the memory to represent the stored signal to produce these delayed signal taps, known as tank memory, is an external memory device attached to extra pins on the sound controller. The present invention makes it possible to move the tank memory of the reverberator to the main personal computer memory while creating a minimal system performance penalty and without requiring extra pins to interface that memory. This reduces both size and cost of the circuitry required to make a reverberator circuit for a personal computer.

Reverberator systems are needed to produce realistic sound for games and other audio simulations in a personal computer where the ability to reverberate sound can give the game designer the ability to simulate motion of the sound source or the listener. The present invention allows for this function to be easily added within the system components of a personal computer without the added cost of a tank memory separate from the main memory of the personal computer.

The present invention also makes it possible for the tank memory to not be contiguous, but consist instead of a set of pages which are discrete blocks of memory starting at arbitrary locations within the physical memory space of the main personal computer memory. This is an advantage in that large contiguous buffers may not be available in a personal computer systems. Modern operating systems allocate physical memory in blocks and are mapped as virtual addresses. This creates a situation where available memory may have gaps that are allocated to other processes in the computer and a large contiguous buffer may not be available when the reverberation processor is needed. An alternative is to allocate the buffer at system startup, but this would leave the buffer unusable by other processes and would result in a waste of main personal computer memory when the reverberation processor is not being used.

Subsystems which process data in real time typically have a high cost in system resources at the time that data is presented or output required. The bus accesses required to read, store and compute results based on the data occur at the times where data is presented, which in a reverberation processor is the sample interval, or when output is required. When system resources are being used heavily by other processes, there is the possibility of failure. Buffer underrun or overrun can occur, which means the system will not be able to keep up with the real-time processing requirement. Even if failure does not occur, a heavy requirement for system resources at one instant in time can cause a loss of smoothness in other processes, making the graphics display or a human input controller operate irregularly. The present invention distributes the resources required by a reverberation processor by ensuring that only one block transfer for one tap can occur at a single sample interval.

SUMMARY OF THE INVENTION

In accordance with one embodiment of the present invention, it is an object of the present invention to provide a reverberation processor for generating digital reverberation using only the main system memory of a personal computer.

It is another object of the present invention to provide a reverberation processor which does not require that the reverberation memory be contiguous, but can comprise blocks of physical memory at arbitrary locations.

It is still another object of the present invention to provide an improved reverberation processor that has consistent and predictable demand on the system bus in order to avoid buffer faults and to minimize impact on other processes and subsystems.

BRIEF DESCRIPTION OF THE PREFERRED EMBODIMENT

In accordance with one embodiment of the present invention, a reverberation processor comprising a register file and an offset logic element for providing an address to memory on a bus and a data storage element for storing reverberation data is disclosed.

The register file is connected to an offset logic block which allows a programmable offset for individual taps and to transfer data over a block of memory. The data is transferred to and from a data storage element for further processing. In order to stagger block transfers so that only one block transfer can occur during a sample period, the data storage elements are pre-loaded to varying fractions of their capacity. This causes subsequent data requests to be offset in time. This balances the load on the system bus and reduces conflicts when more than one reverberator is operating within a system.

The foregoing and other objects, features, and advantages of the invention will be apparent from the following, more particular, description of the preferred embodiment of the invention, as illustrated in the accompanying drawings.

DETAILED DESCRIPTION OF THE PREFERRED EMBODIMENT

Figure 1:
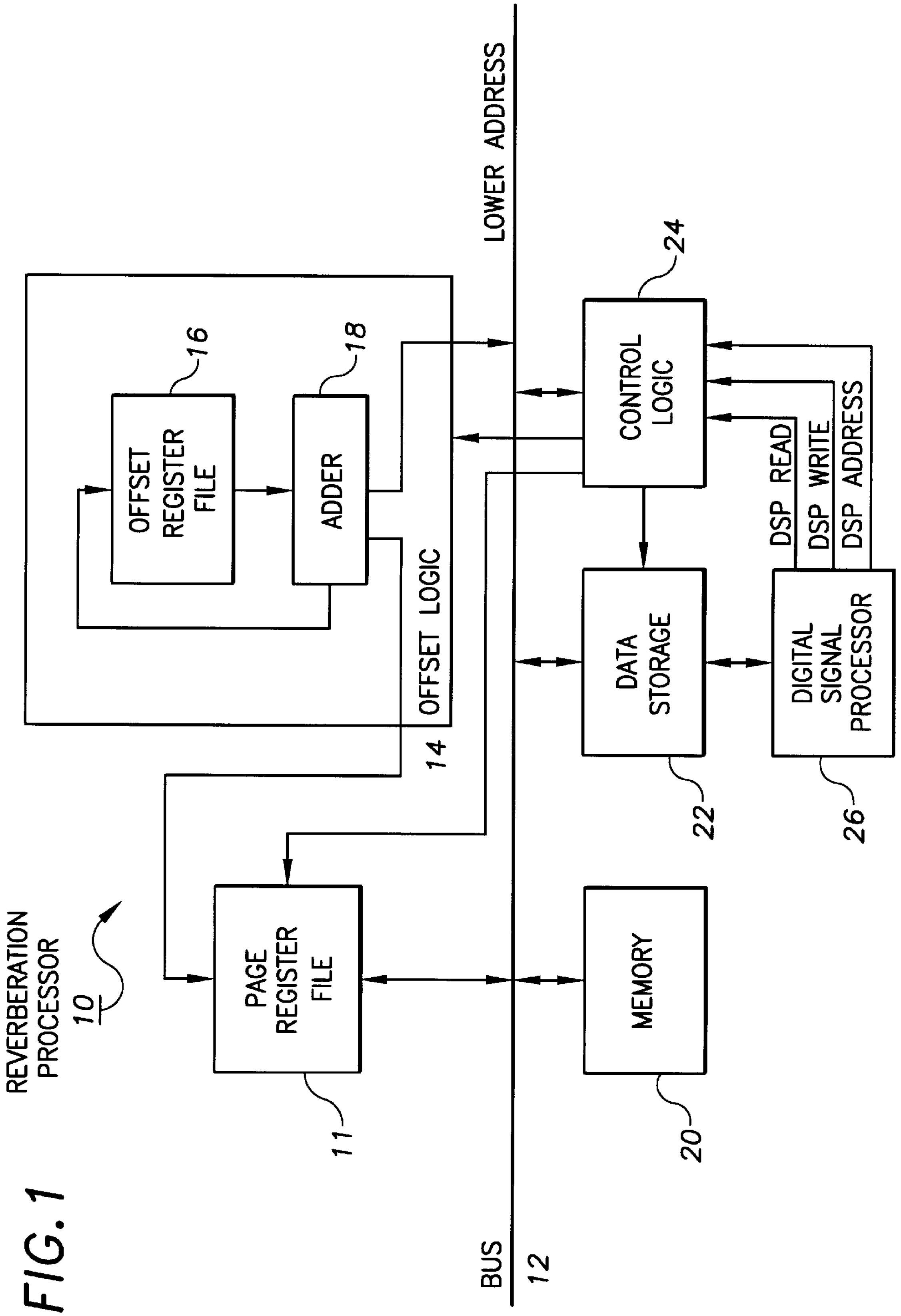
FIG. 1 is a simplified functional block diagram of the reverberation processor.

Referring to FIG. 1, a digital reverberation processor 10 is shown. The page register file 11 is programmed with the starting addresses of blocks of audio data corresponding to taps of the reverberation processor. These taps are structured so that audio data from each tap is displaced in memory 20 by a relative address corresponding to the time delay desired for the tap and the tap corresponds to the position of audio data that has been delayed by some amount corresponding to a desired audio reflection time. The position of these taps may be dynamically adjusted by the system which incorporates the reverberation processor when needed due to a change in time delay such as that required when simulating a source moving through a reverberant room. When the signals from each tap are combined, the resultant data consists of audio data which has been delayed by varying amounts of time, multiplied by a number corresponding to the relative amplitude of the tap, summed together and then returned to memory 20. This allows for reverberation reflections to be again generated on data that has already been processed by the reverberation processor 10. This provides for a feedback function that more closely simulates a natural reverberant environment. It is not necessary to return the reverberated data to memory 20 to practice this invention but is a feature of the preferred embodiment. The contents of the page register file 11 drive the upper portion of the address corresponding to the beginning of the memory page address for each tap onto the bus 12 while blocks of audio data are being transferred. These pages can be reprogrammed as needed to adjust the location of taps in memory 20 to change the effective time delay for the each tap. The page register file 11 allows for automatic selection of a number of pages that are arbitrarily located in the memory 20 to be used for the generation of reverberation data. The offset logic 14 provides the lower portion of the address and control inputs to the page register file 11. This allows the offset locations of the reverberation taps and the page locations to be selected. These offset values can also be reprogrammed as needed to vary the delay time for a given tap. The offset register file 16 is programmed with numbers combining the starting offset of the reverberation taps as the lower bit field and the page register to be selected from the page register file 11 for the taps as the upper bit field. The taps are aligned so as not to cause a page fault within a single block transfer. This results in a small error with respect to the actual location of the tap, but is on the order of a few samples of audio data and will be inaudible. This provides better system performance by not requiring that page changes be handled in the bus 12 during a block transfer and simplifies the implementation of the reverberation processor 10 in that a page will not have to be reselected within a block transfer. In the preferred embodiment of the invention, the output of the offset register file 16 is input to an adder 18 which increments the address after each transfer by a value corresponding to the block size that was transferred. In the preferred embodiment the adder 18 also supplies the register selection input of the offset register file 16. This allows the adder 18 to automatically select a different offset in sequence for each tap as each block transfer is completed. The offset register file 16 select input and the lower portion of the block transfer address could alternatively be provided by the control logic 24. The lowest bits of the address which select the individual bytes in the block can be derived from the bus 12, by a bus 12 that supports block transfers to memory via a bus controller (not shown), or supplied by the offset logic 14 address output.

The control logic 24 signals the offset logic 14 to provide offset addresses to the bus 12 and signals the page register file 11 to provide page addresses to the bus 12. It also signals the offset logic 14 to change the address after each block transfer. The digital signal processor (DSP) 26 accesses the data storage 22 by means of the control logic 24. The read and write control signals and address lines from the DSP 26, are inputted to the control logic 24 and are combined so as to allow the DSP 26 to access the individual storage elements in the data storage element 22. The data storage element 22 contains tap data that is read from the bus 12 by the reverberation processor 10 and reverb result data computed by the DSP 26. When the reverb tap data in the data storage 22 is below some threshold number of bytes, the control logic 24, will request a block transfer to the data storage 22 from the memory 20. Likewise when the reverb result data in the data storage 22 is above some threshold number of bytes, the control logic 24 will cause a transfer of that data from the data storage 22 to the memory 20.

Figure 2:
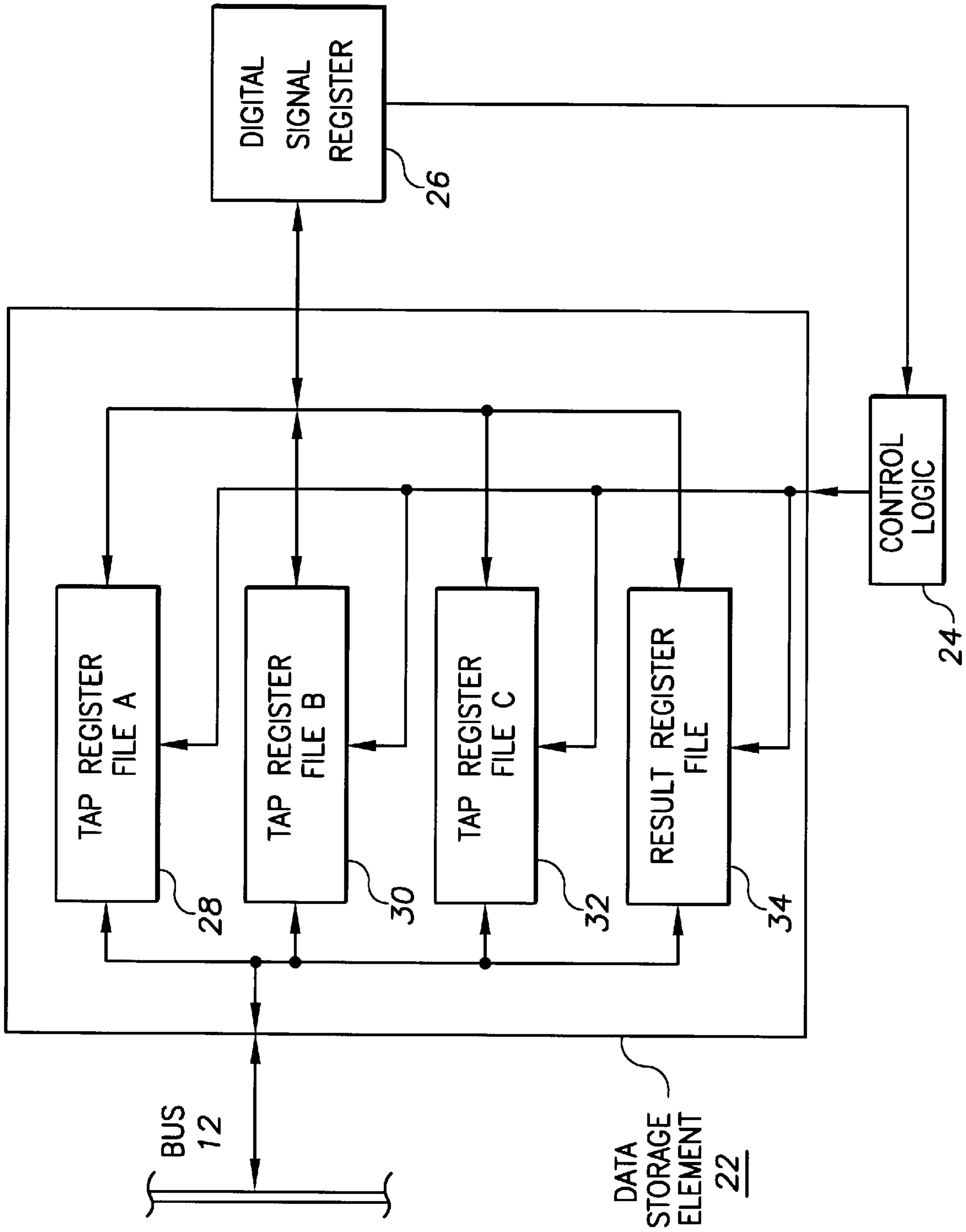
FIG. 2 is a simplified functional block diagram of the data storage element.

In the preferred embodiment, the data storage element 22 is comprised of a multiplicity of dual-port register files. Referring to FIG. 2, a data storage element 22 with four register files is shown. Tap register file A 28, tap register file B 30 and tap register file C 32 hold data that has been retrieved, from memory 20 (FIG. 1) via the bus 12 (FIG. 1) for processing by the DSP 26 (FIG. 1). Result register file 34, holds data that has been computed by the DSP 26 (FIG. 1) and will be written to memory 20 via the bus 12 by the reverberation processor 10 (FIG. 1). Within the data storage is one register file for each reverberation tap and one register file for the resultant reverberation data. This allows the DSP 26 to access the tap and result data without disrupting the operation of the bus 12. In the preferred embodiment, the register files 28, 30, 32 and 34 are pre-loaded with different amounts of data, so that the transfer triggering thresholds are reached at a different point in the computation cycle for each of the register files. This provides that only one block transfer will occur within a single sample period. In a system comprising several of these reverberation processors 10, it is possible to further enhance system performance by programming each data storage register file within storage element 22 in each reverberation processor 10 with a unique amount of data. This will ensure that only one block transfer will occur within a single sample period over all reverberation processors 10 in the system.

Figure 3:
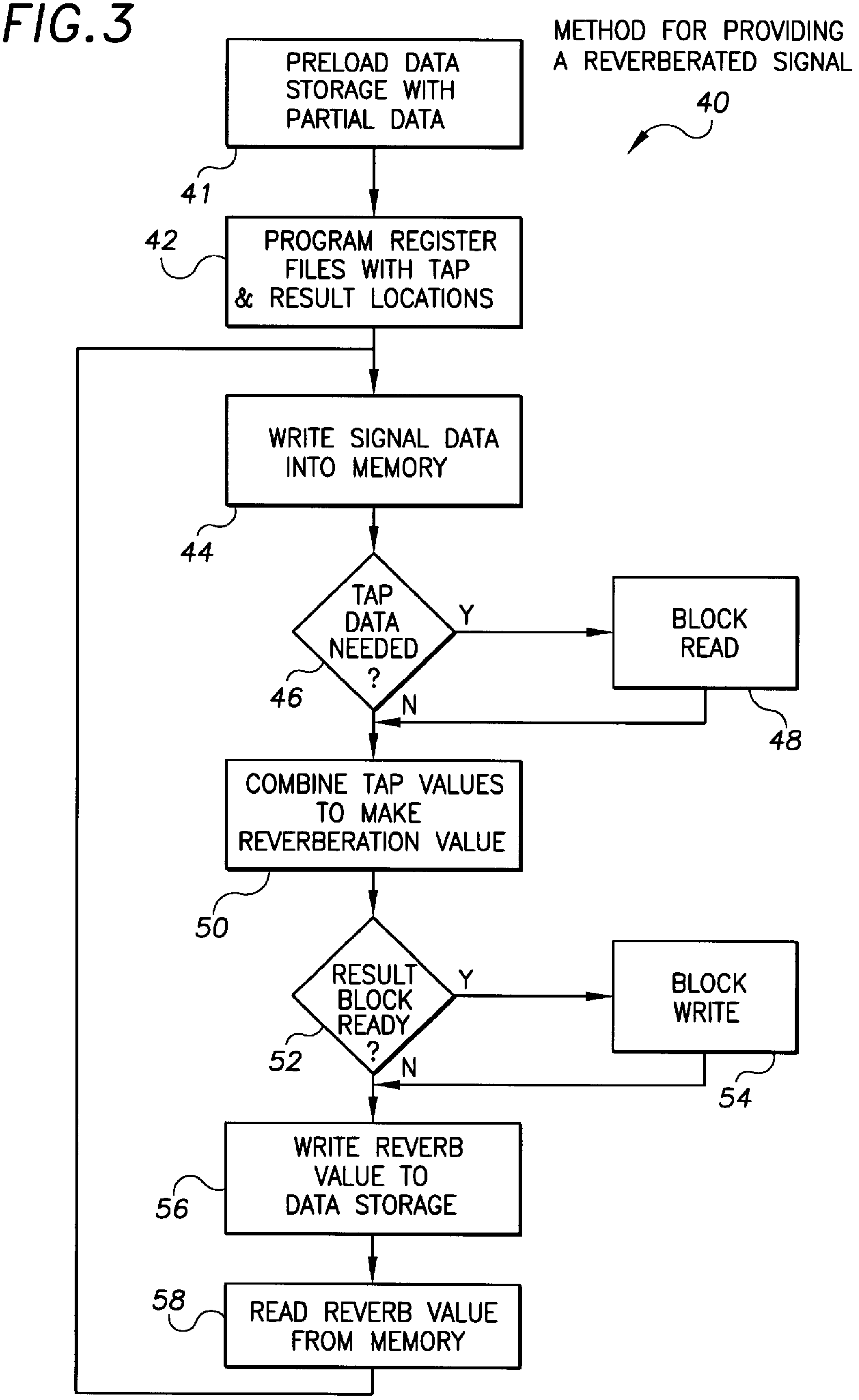
FIG. 3 is a simplified flow diagram of the method for providing a reverberated signal.

Referring to FIGS. 1 and 3, the operation of the reverberation processor 10 will be discussed. The method is used by the preferred embodiment of the reverberation processor 10. The data storage element 22 is pre-loaded with the appropriate amount of data to stagger the cycles 41 by the control logic 24. The page register file 11 and offset register file 16 are programmed with the memory locations for the taps and the resulting reverberation data. The signal data is then written into memory 20. This can either be accomplished by the reverberation processor 10 or another agent on the bus 12. If data is required for a tap, tap values are transferred by the action of the reverberation processor 10. A reverberation value is calculated by the DSP 26 and stored in data storage 22. If a complete result block is ready, it is transferred to memory 20 in step 54 by the reverberation processor 10. The resulting reverberated data is then read and used. The order performance of these steps is not critical to the operation of the system. The buffering provided by the data storage allows the asynchronous operation of different portions of the process.

Figure 4:
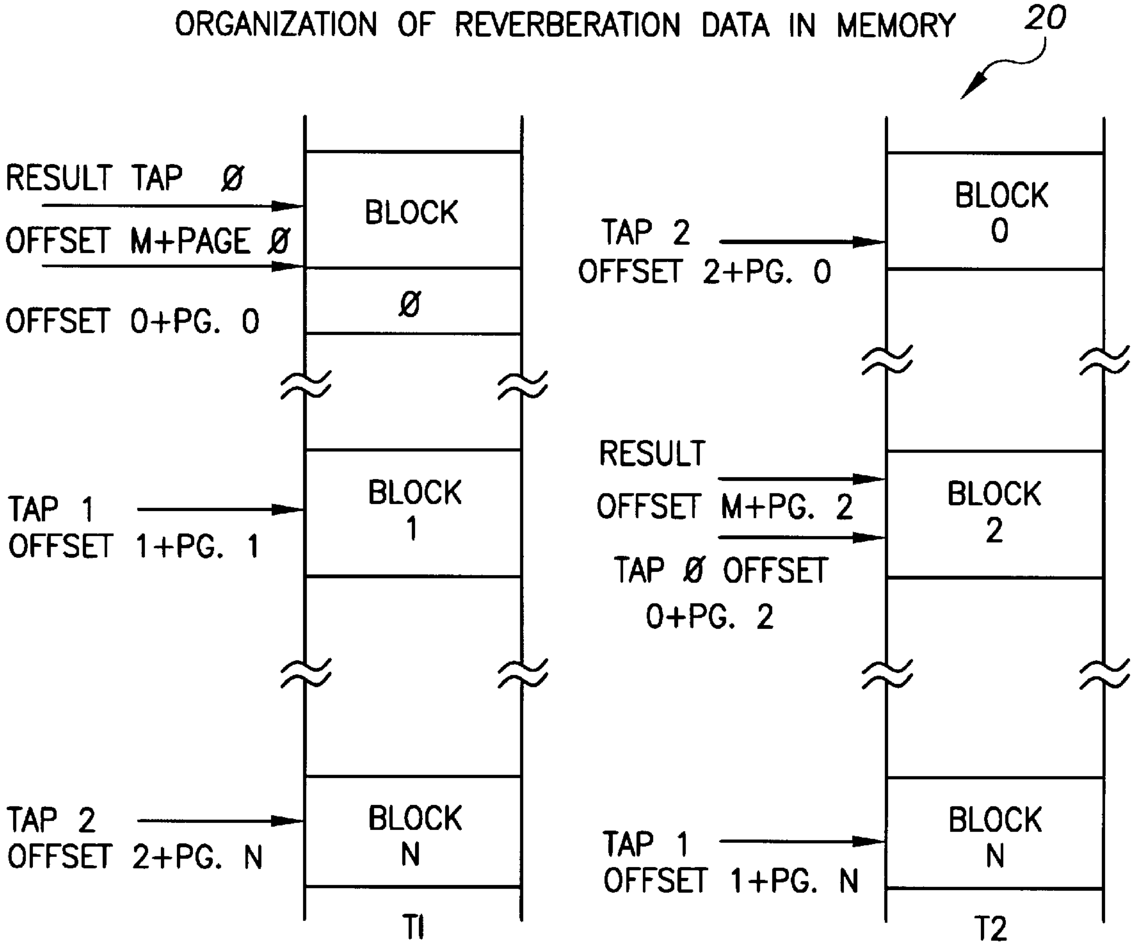
FIG. 4 is a diagram showing the organization of reverberation data in memory.

FIG. 4 shows the organization of reverberation data in memory 20. Unless the page and offset registers are reprogrammed, the offset location of the each tap is fixed with respect to the other taps. The page location which selects the memory block for each tap varies as the tap addresses progress through memory. In FIG. 4, the location of the tap addresses are shown in two instances. In the second column, the tap 2 location has wrapped around to page 0 and taps 0 and 1 have progressed to other blocks. In FIG. 3, the result data is shown just below tap 0 in address value. This corresponds to a system using the maximum amount of reverberation time available for tap 0, since it will take the system a complete cycle to read the result data for the next input to tap 0. If the tap values are adjusted to be just less than the result value being written, the minimum amount of delay is achieved. The positive increment value shown in the drawing is not intended to limit the invention to one where the address values are incremented for each transfer. A reverberator where the address value decrements for each transfer is a simple modification and is also contemplated by this invention.

Figure 5:
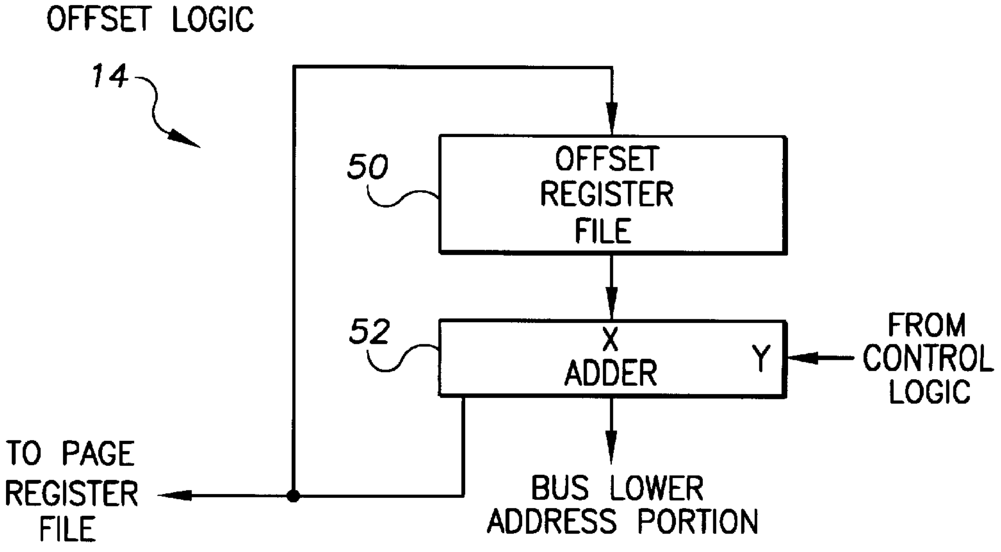
FIG. 5 is a simplified functional block diagram of the offset logic.

FIG. 5 shows the internal structure of the preferred embodiment of the offset logic 14. The offset logic comprises an offset register file 60 and an adder 62. The adder has two inputs X and Y as shown in FIG. 5. The Y input is inputted from the control logic element and corresponds to the lower portion of the block transfer address. The X input is inputted from the offset register file, which contains the starting offset addresses for each tap. As transfers are made, the control logic inputs a different count value to the adder 52. This value is added to the offset address to derive an added output. The lower portion of the added output is driven onto the bus when the reverberation processor is transferring blocks of data and provides the lower portion of the address for accessing that data. The upper portion of the added output is inputted to the page register file to select the page address. Thus, as the transfer address increments and a tap address location moves into another memory page, this output selects the next page address automatically. This also allows the tap addresses to wrap around to page 0 after the last address location of the last page has been read or written by the particular tap.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A reverberation processor comprising, in combination:

a bus;

a memory coupled to said bus;

at least one register file coupled to said bus and having a plurality of registers for accessing separate blocks of said memory;

an offset logic element coupled to said at least one register file and to said bus for selecting one of said plurality of registers in said at least one register file;

a data storage element coupled to said bus for storing blocks of data read from said memory and blocks of data to be written to said memory; and a control logic element coupled to said data storage element for controlling reads from and writes to said data storage element.

2. A reverberation processor in accordance with claim 1 wherein said offset logic clement comprises:

an address computation element coupled to said bus for controlling a lower portion of an address separately from a upper portion of said address controlled by said at least one register file; and a second register file coupled to said address computation element for providing an offset value.

3. A reverberation processor in accordance with claim 2 wherein a plurality of outputs of said address computation element are coupled to a plurality of register select inputs of said second register file for selecting a block address.

4. A reverberation processor in accordance with claim 3 wherein said address computation element comprises an adder for adding said offset from said second register file with a number to provide said lower portion of said address.

5. A reverberation processor in accordance with claim 4 wherein said data storage element comprises a multiplicity of dual port register files adapted to buffer tap data and reverberated data.

6. A reverberation processor in accordance with claim 5 further comprising a processor coupled to said data storage element to allow computation on values stored therein.

7. A reverberation processor in accordance with claim 6 wherein said bus is a PCI bus.

8. A reverberation processor in accordance with claim 2 wherein said bus is a PCI bus.

9. A reverberation processor in accordance with claim 3 wherein said bus is a PCI bus.

10. A reverberation processor in accordance with claim 4 wherein said bus is a PCI bus.

11. A reverberation processor in accordance with claim 1 wherein said data storage element comprises a multiplicity of dual port register files adapted to buffer tap data and reverberated data.

12. A reverberation processor in accordance with claim 1 further comprising a processor coupled to said data storage element to allow computation on values stored therein.

13. A reverberation processor in accordance with claim 1 wherein said bus is a PCI bus.

14. A reverberation processor comprising:

a bus;

a memory coupled to the bus;

a set of registers adapted to access separate blocks of the memory via the bus;

an offset logic element coupled to the set of registers and to the bus and adapted to select one of the set of registers;

a data storage element coupled to the bus and adapted to store blocks of data read from the memory and blocks of data to be written to the memory; and a control logic element coupled to the data storage element and adapted to control reads from and writes to the data storage element and preload the data storage element with a different fraction of a block transfer size for each tap to prevent block requests from occurring contemporaneously.

15. A reverberation processor comprising:

a PCI bus;

a memory coupled to the bus;

a set of registers adapted to access separate blocks of the memory via the bus;

an offset logic element coupled to the set of registers and to the bus and adapted to select one of the set of registers, wherein said offset logic element includes:

an address computation element coupled to said bus for controlling a lower portion of an address controlled by said set of registers; and a second set of registers coupled to said address computation element for providing an offset value, wherein a plurality of outputs of said address computation element are coupled to select inputs or the second set of registers for selecting a block address, and wherein said address computation element comprises an adder for adding said offset from said second set of registers with a number to provide said lower portion of said address;

a data storage element coupled to the bus and adapted to store blocks of data read from the memory and blocks of data to be written to the memory, wherein the data storage element includes a multiplicity of dual port registers adapted to buffer tap data and reverberated data;

a processor coupled to said data storage element to allow computation on values stored therein; and a control logic element coupled to the data storage element and adapted to control reads from and writes to the data storage element, and preloads the data storage element with a different fraction of a block transfer size for each tap to prevent block requests from occurring contemporaneously.

16. A system comprising a reverberation processor in accordance with claim 15, further comprising:

at least one additional reverberation processor comprising a bus; a memory coupled to the bus; a set of registers adapted to access separate blocks of the memory; an offset logic element coupled to the set of registers and to the bus and adapted to select one of the set of registers; a data storage element coupled to the bus and adapted to store blocks of data read from the memory and blocks of data to be written to the memory; and a control logic element coupled to the data storage element and adapted to control reads from and writes to the data storage element and to preload the data storage element with a different fraction of a block transfer size for each tap to prevent block requests from occurring contemporaneously, wherein said additional reverberation processor bus is coupled to said reverberation processor bus and wherein said reverberation processor and said at least one additional reverberation processor utilize unique fractions of a block transfer size to preload said data storage elements to prevent block transfers from said reverberation processor and said at least one additional reverberation processor from occurring contemporaneously.

17. A system comprising:

a reverberation processor comprising a bus; a memory coupled to the bus; a set of registers adapted to access separate blocks of the memory; an offset logic element coupled to the set of registers and to the bus and adapted to select one of the set of registers; a data storage element coupled to the bus and adapted to store blocks of data read from the memory and blocks of data to he written to the memory; and a control logic element coupled to the data storage clement and adapted to control reads from and writes to the data storage element and to preload the data storage element with a different fraction of a block transfer size for each tap to prevent block requests from occurring contemporaneously; and at least one additional reverberation processor coupled to the bus, wherein said reverberation processor and said at least one additional reverberation processor utilize unique fractions of a block transfer size to preload said data storage elements to prevent block transfers from said reverberation processor and said at least one additional reverberation processor from occurring contemporaneously.

18. A method for providing a reverberated signal comprising die steps of:

writing tap addresses into a set of registers;

writing signal data into memory;

selecting one of said tap addresses for each reverb tap by selecting a tap register from said set of registers;

reading a memory block at said tap address for each tap;

combining values in said memory block from each tap address;

selecting a result address for a resultant reverberated signal data by selecting a result register from said set of registers; and writing the resultant reverberated signal data at said result address.

19. A method for providing a reverberated signal comprising the steps of:

writing tap page addresses into a page register file having a set of page registers;

writing tap offset addresses into an offset register file having a set of offset registers;

writing signal data into memory;

selecting one of said tap page addresses for each reverb tap by selecting a first page register from said page register file;

selecting one of said tap offset addresses for each reverb tap by selecting a first offset register from said offset register file;

reading a memory block at each tap address;

combining the values in said memory block from each tap address;

selecting a page address for a reverberated data block by selecting a second page register from said page register file;

selecting an offset address for said reverberated data block by selecting a second offset register from said offset register file; and writing said reverberated signal data at said second page address and said offset address.

20. A method for providing a reverberated signal comprising the steps of:

writing a predetermined amount of data into a data storage block;

writing tap page addresses into a page register file having a set of page registers;

writing tap offset addresses into an offset register file having a set of offset registers;

writing signal data, into memory;

selecting a tap page address for each reverb tap by selecting a tap page register from said page register file;

selecting a tap offset address for each reverb tap by selecting a tap offset register from said offset register file;

reading a block of memory at each tap address into a data storage block;

combining the values from said data storage block to produce a reverberated data block;

writing said reverberated data block to said data storage block;

selecting a result page address for said reverberated data block by selecting a page register from said page register file;

selecting a result offset address for said reverberated data block by selecting an offset register from said offset register file; and writing said reverberated data block at a result address specified by said result page address and said result offset address.

* * * * *

UNITED STATES PATENT AND TRADEMARK OFFICE
CERTIFICATE OF CORRECTION

PATENT NO. : 6,247,095 B1
DATED : June 12, 2001
INVENTOR(S) : Knudsen

It is certified that error appears in the above-identified patent and that said Letters Patent is hereby corrected as shown below:

Drawings,
FIG 1, Box 22 should read -- DATA STORAGE ELEMENT --.
FIG 2, Box 26 “DIGITAL SIGNAL REGISTER” should read -- DIGITAL SIGNAL PROCESSOR --.
FIG 5, “50” should read -- 60 --.
FIG 5, “52” should read -- 62 --.

Column 1,
Line 61, after “in”, please delete “a”.

Column 3,
Line 39, after “for”, please delete “the”.

Column 4,
Lines 16, 21, 23, 24, 26 and 32, after “storage”, please insert -- element --.
Line 37, after “retrieved”, please delete “,”.

Column 5,
Line 8, after “location of”, please insert -- the --.

Column 6,
Line 5, “clement” should read -- element --.
Line 8, “a” should read -- an --.

Column 7,
Line 10, “or” should read -- of --.
Lines 37 and 60, “set” should read -- sets --.
Line 63, “he” should read -- be --.
Line 64, “clement” should read -- element --.

UNITED STATES PATENT AND TRADEMARK OFFICE

CERTIFICATE OF CORRECTION

PATENT NO. : 6,247,095 B1
DATED : June 12, 2001
INVENTOR(S) : Knudsen

It is certified that error appears in the above-identified patent and that said Letters Patent is hereby corrected as shown below:

Column 8,
Line 12, “die” should read -- the --.
Line 60, please delete “,” after “data”.

Signed and Sealed this

First Day of April, 2003

JAMES E. ROGAN
*Director of the United States Patent and Trademark Office*